United States Patent
Wu et al.

(10) Patent No.: US 9,013,419 B2
(45) Date of Patent: Apr. 21, 2015

(54) TOUCH PANEL

(75) Inventors: Hsu-Ho Wu, Tainan (TW); Sung-Chun Lin, Tainan (TW); Yi-Chung Juan, Kaohsiung (TW); Chang-Ching Yeh, Kaohsiung (TW)

(73) Assignee: Hannstar Display Corp., New Taipei (TW)

( * ) Notice: Subject to any disclaimer, the term of this patent is extended or adjusted under 35 U.S.C. 154(b) by 361 days.

(21) Appl. No.: 13/277,679

(22) Filed: Oct. 20, 2011

(65) Prior Publication Data

US 2013/0009886 A1    Jan. 10, 2013

(30) Foreign Application Priority Data

Jul. 5, 2011   (TW) .............................. 100123750 A

(51) Int. Cl.
  *G06F 3/041*   (2006.01)
  *G09G 3/36*   (2006.01)

(52) U.S. Cl.
  CPC *G06F 3/041* (2013.01); *G09G 3/36* (2013.01); *G09G 3/3648* (2013.01); *G09G 2300/0426* (2013.01); *G09G 2330/04* (2013.01)

(58) Field of Classification Search
  CPC ....... G06F 3/041; G06F 3/044; G06F 3/0412; G06F 3/0416; G06F 3/0488; G06F 2203/04107; G09G 3/36; G09G 2330/04; G09G 3/3648; G09G 2300/0426; G02F 1/13338; G02F 1/134363; G02F 2001/134372; H04N 1/00411

USPC .................................................... 345/173, 104
See application file for complete search history.

(56) References Cited

U.S. PATENT DOCUMENTS

| | | | | |
|---|---|---|---|---|
| 5,394,096 | A  * | 2/1995  | Meyer ........................... | 324/686 |
| 5,940,064 | A  * | 8/1999  | Kai et al. ....................... | 345/173 |
| 7,920,129 | B2 * | 4/2011  | Hotelling et al. ............. | 345/173 |
| 8,643,796 | B2 * | 2/2014  | Kimura et al. ................ | 345/173 |
| 2008/0018613 | A1* | 1/2008 | Kim et al. ..................... | 345/173 |
| 2008/0309633 | A1* | 12/2008 | Hotelling et al. ............. | 345/173 |
| 2009/0085885 | A1* | 4/2009 | Wu et al. ....................... | 345/173 |
| 2009/0213090 | A1* | 8/2009 | Mamba et al. ................ | 345/174 |
| 2010/0007621 | A1* | 1/2010 | Kang et al. .................... | 345/173 |
| 2010/0259503 | A1* | 10/2010 | Yanase et al. ................. | 345/174 |
| 2011/0032193 | A1* | 2/2011 | Szalkowski ................... | 345/173 |
| 2011/0221700 | A1* | 9/2011 | Mo et al. ....................... | 345/174 |
| 2011/0254802 | A1* | 10/2011 | Philipp ......................... | 345/174 |
| 2012/0098782 | A1* | 4/2012 | Nam .............................. | 345/174 |

FOREIGN PATENT DOCUMENTS

TW         200813799 A     3/2008

* cited by examiner

*Primary Examiner* — Dwayne Bost
*Assistant Examiner* — Ivelisse Martines Quiles
(74) *Attorney, Agent, or Firm* — Muncy, Geissler, Olds & Lowe, P.C.

(57) ABSTRACT

An embodiment of this invention provides a touch panel, which comprises a touch screen and a display. The touch screen comprises a patterned, transparent first conductive layer comprising a sensing pattern and a shielding pattern. The touch panel features in that the touch screen employs the sensing pattern as a sensing layer, and the display employs the shielding pattern as an electrostatic protection layer.

8 Claims, 4 Drawing Sheets

TOUCH PANEL

CROSS REFERENCE TO RELATED APPLICATIONS

The entire contents of Taiwan Patent Application No. 100123750, filed on Jul. 5, 2011, from which this application claims priority, are incorporated herein by reference.

BACKGROUND OF THE INVENTION

1. Field of the Invention

The present invention relates to touch panels with low cost.

2. Description of Related Art

Touch panels incorporated with touch control and display technologies are widely used in electronic devices, such as cellular phones, digital cameras, computers, and so on. The user interface of such devices not only presents visual information but also allows the user to perform operations.

Touch panels can be divided into on cell touch panels and in cell touch panels. The on cell touch panels include a touch screen and a display, in which the former comprises touch sensors constructed by transparent patterns and the latter may be a liquid crystal display. The in cell touch panels integrate the touch sensors or photo sensors into the pixels of the liquid crystal display.

Because the manufacturing steps are increased, the cost of the on cell touch panels is higher than that of the in cell touch panels. FIG. 1 and FIG. 2 show the causes of high manufacturing cost, in which FIG. 1 is a cross-section of a fringe field switching mode liquid crystal display (FFS LCD) and FIG. 2 is a cross-section showing a touch screen formed on the FFS LCD.

Referring to FIG. 1, the FFS LCD primarily includes a lower substrate 10, an upper substrate 20, and a liquid crystal layer 30 arranged between the two substrates 10/20. In addition, a counter electrode 11 is arranged on the inner surface of the lower substrate 10, a gate insulation layer 12 is arranged on the counter electrode 11, pixel electrodes 13 are arranged on the gate insulation layer 12, and an alignment layer 14 covers the pixel electrodes 13. The counter electrode 11 and the pixel electrodes 13 are typically made of transparent conductive materials, such as indium tin oxide (ITO); they are employed for driving the liquid crystal layer 30, and the distance between the counter electrode 11 and the pixel electrodes 13 is less than the distance between the upper substrate 20 and the lower substrate 10. Besides, the lower substrate 10 further includes gate lines (not shown) and data lines (not shown) orthogonally arranged with each other to define the pixels, and thin-film transistors are arranged near the intersections of the data lines and gate lines.

Furthermore, black matrixes 21 are formed below the inner surface of the upper substrate 20. Color filters 22, including red (R), green (G), and blue (B) filters, are arranged between the black matrixes 21. An over coating layer 23 is arranged below the black matrixes 21 and the color filters 22 for protecting the color filters 22 and flattening the surface. An alignment layer 24 is formed below the over coating layer 23. In addition, polarizing plates may be respectively arranged on the outer surface of the upper substrate 20 and below the outer surface of the lower substrate 10.

When different voltages are respectively supplied to the counter electrode 11 and the pixel electrodes 13, a fringe filed is thus generated to drive the liquid crystal layer 30. Because both two driving electrodes 11/13 are arranged at the side of the lower substrate 10, the touch panel may suffer from electrostatic issues. To overcome this problem, a transparent conductive layer 25, such as indium tin oxide, is arranged on the outer surface of the upper substrate 20 as an electrostatic protection layer 25.

Referring to FIG. 2, an insulation layer 40 or an over coating layer 40 has to be formed to isolate the transparent conductive layer 25 before forming touch sensors. After that, a transparent conductive layer 41, an insulation layer 42, a transparent conductive layer 43, a protective layer 44, and so on are formed on the over coating layer 40, for forming the touch sensors.

It is clear that the increased layers will increase the manufacturing steps and the material cost, resulting in low yield and high cost. Therefore, it would be advantageous to provide a novel touch panel with low cost.

SUMMARY OF THE INVENTION

An object of this invention is to provide novel touch panels with low cost.

An embodiment of this invention provides a touch panel, comprising a touch screen for sensing a touch position and a display arranged below the touch screen. The touch screen comprises a patterned, transparent first conductive layer at least including a first sensing pattern and a shielding pattern, in which the touch screen employs the sensing pattern as a sensing layer for sensing the touch position, and the display employs the shielding pattern as an electrostatic protection layer.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not been described in detail in order not to unnecessarily obscure the present invention. While drawings are illustrated in details, it is appreciated that the quantity of the disclosed components may be greater or less than that disclosed, except expressly restricting the amount of the components.

Figure 3:
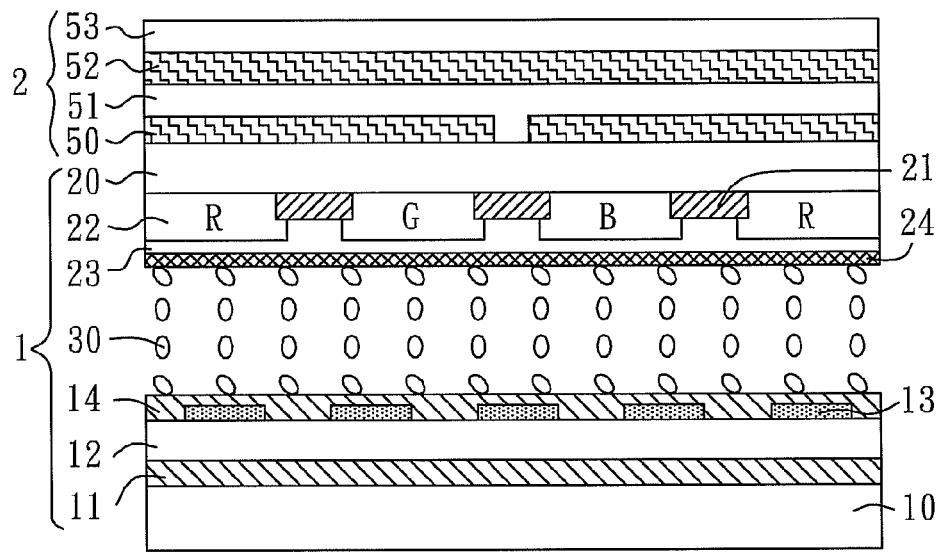
FIG. 3 is a cross-section of a touch panel according to a preferred embodiment of this invention.

FIG. 3 is a cross-section of a touch panel according to a preferred embodiment of this invention. The touch panel comprises a touch screen 2 and a display 1, and the elements of the touch screen 2 are firstly introduced. A patterned, transparent first conductive layer 50, such as indium tin oxide, is formed on the display 1. A transparent over coating layer 51, such as epoxy resins, acrylic resins, dielectric materials, or positive/negative type of photoresists, is formed on the first conductive layer 50. A patterned, transparent second conductive layer 52, such as indium tin oxide, is formed on the first coating layer 51. A protective layer 53 with high hardness is formed on the second conductive layer 52. The first conductive layer 50, the over coating layer 51, and the second conductive layer 52 construct touch sensors of the touch screen 2. Notice that other embodiments of this invention may employ other structures of touch screen known in the art.

Besides, a cover lens (not shown), made of transparent materials such as polyethyleneterephthalate (PET), may be arranged on the protective layer 53, and one or more insulation layers may be further arranged between the cover lens and the protective layer 53.

The elements of the display 1 are then introduced. In this embodiment, the display is a FFS LCD, but it should not be limited. The display 1 primarily comprises a lower substrate 10, an upper substrate 20, and a liquid crystal layer 30 arranged between the two substrates 10/20. In addition, a counter electrode 11 is arranged on the inner surface of the lower substrate 10, a gate insulation layer 12 is arranged on the counter electrode 11, pixel electrodes 13 are arranged on the gate insulation layer 12, and an alignment layer 14 covers the pixel electrodes 13. The counter electrode 11 and the pixel electrodes 13 are typically made of transparent conductive materials, such as indium tin oxide (ITO); they are employed for driving the liquid crystal layer 30, and the distance between the counter electrode 11 and the pixel electrodes 13 is less than the distance between the upper substrate 20 and the lower substrate 10. Besides, the lower substrate 10 further includes gate lines (not shown) and data lines (not shown) orthogonally arranged with each other to define the pixels, and thin-film transistors are arranged near the intersections of the data lines and gate lines.

Furthermore, black matrixes 21 are formed below the inner surface of the upper substrate 20. Color filters 22, including red (R), green (G), and blue (B) filters, are arranged between the black matrixes 21. An over coating layer 23 is arranged below the black matrixes 21 and the color filters 22 for protecting the color filters 22 and flattening the surface. An alignment layer 24 is formed below the over coating layer 23. In addition, polarizing plates may be respectively arranged on the outer surface of the upper substrate 20 and below the outer surface of the lower substrate 10.

As discuss above, because the counter electrode 11 and the pixel electrodes 13 are both arranged at the side of the lower substrate 10, the touch panel may suffer from electrostatic issues. To overcome this problem, the first conductive layer 50 is utilized as not only the touch sensors but also an electrostatic protection layer.

Figure 4:
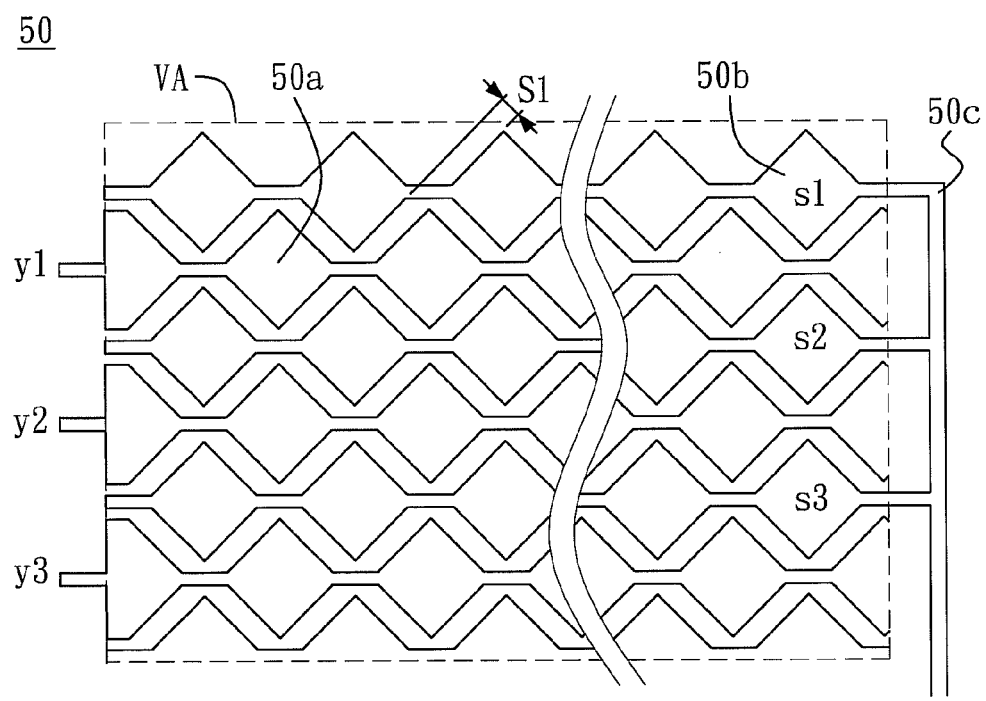
FIG. 4 is a top view of the first conductive layer of FIG. 3.
Figure 5:
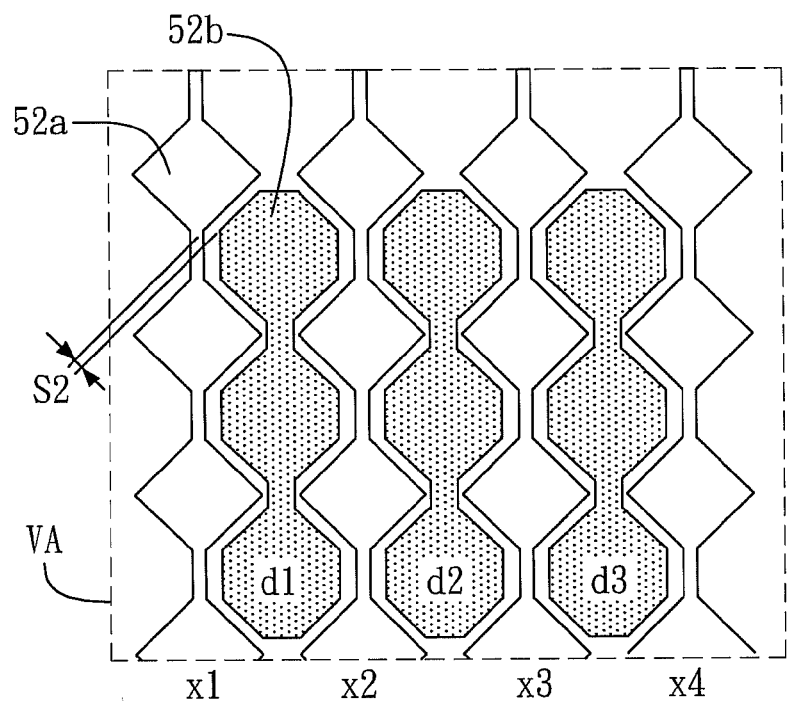
FIG. 5 is a top view of the second conductive layer of FIG. 3.
Figure 6:
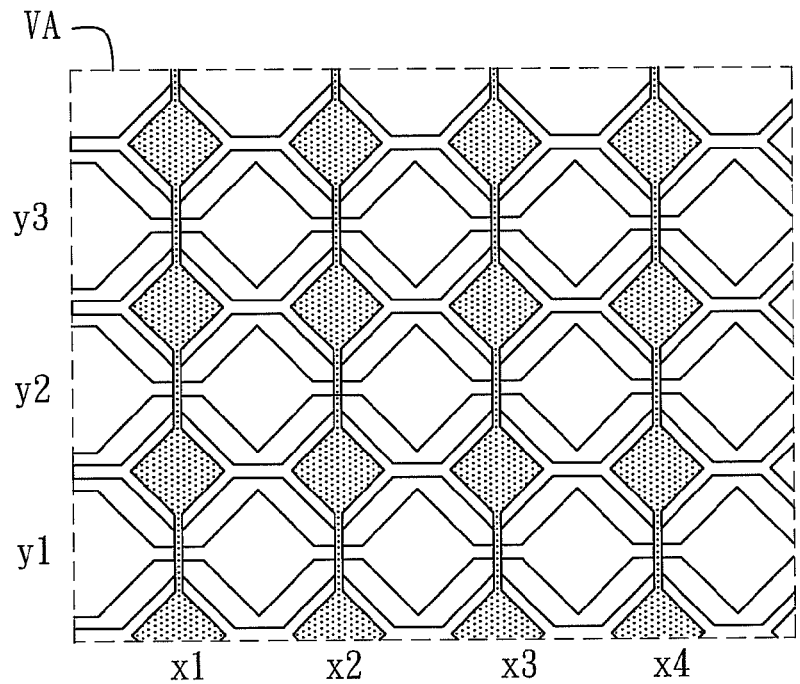
FIG. 6 illustrates the second conductive layer stacked on the first conductive layer.
Figure 7A:
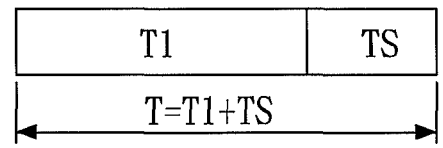
FIG. 7A illustrates a driving method of the touch panel shown in FIGS. 4-7.

FIG. 4 to FIG. 7B illustrates structures and methods for the first conductive layer 50, in which FIG. 4 is a top view of the first conductive layer 50 of FIG. 3, FIG. 5 is a top view of the second conductive layer 52 of FIG. 3, FIG. 6 illustrates the second conductive layer 52 stacked on the first conductive layer 50, FIG. 7A illustrate a driving method of the touch panel shown in FIGS. 4-7, and FIG. 7B is an example of FIG. 7A.

Referring to FIG. 4, the first conductive layer 50 is arranged within a viewable area (VA) and comprises a sensing pattern 50a and a shielding pattern 50b electrically disconnected with each other. The sensing pattern 50a is constructed by a plurality of horizontally arranged conductive wires (y1, y2, y3 . . . ), which are electrically disconnected with one another but connected to a same power source. The shielding pattern 50b is constructed by a plurality of horizontally arranged conductive wires (s1, s2, s3 . . . ), which are electrically connected with one another by a conductive wire 50c arranged at the outside of the viewable area VA. The shapes of the shielding pattern 50b and the sensing pattern 50a are not limited. Typically, the width of the slits S1 between the shielding pattern 50b and the sensing pattern 50a should be small, and the slits S1 may be arranged above the black matrixes 21. In addition, the shielding pattern 50b is also function as a dummy pattern of the sensing pattern 50a. By the dummy pattern, the profile of the sensing pattern 50a will not appear for the viewer. In other words, the viewer cannot distinguish which areas with conductive wires (y1, y2, y3) and which areas without.

Referring to FIG. 5, the second conductive layer 52 is arranged within the viewable area (VA) and comprises a sensing pattern 52a and a dummy pattern 52b electrically disconnected with each other. The sensing pattern 52a is constructed by a plurality of vertically arranged conductive wires (x1, x2, x3 . . . ), which are electrically disconnected with one another but connected to a same power source. The dummy pattern 52b is constructed by a plurality of sub-dummy patterns (d1, d2, d3 . . . ) vertically arranged between the conductive wires (x1, x2, x3 . . . ) and electrically disconnected to any power source. The shapes of the sensing pattern 52a and the dummy pattern 52b are not limited. Typically, the width of the slits S2 between the sensing pattern 52a and the dummy pattern 52b should be small, and the slits S2 may be arranged above the black matrixes 21. Notice that some embodiments of this invention may omit the dummy pattern 52b.

Referring to FIG. 6, the sensing pattern wires (y1, y2, y3 . . . ) of the first conductive layer 50 and the sensing pattern wires (x1, x2, x3 . . . ) of the second conductive layer 52 construct resistance or capacitance type of touch sensors; the user's touch will cause the change of resistance or capacitance at the touch point.

Notice that in another embodiment, the sensing pattern 50a and the shielding pattern 50b may be vertically arranged, and the sensing pattern 52a and the dummy pattern 52b may be horizontally arranged. Besides, the patterns may have other configurations.

Figure 7B:
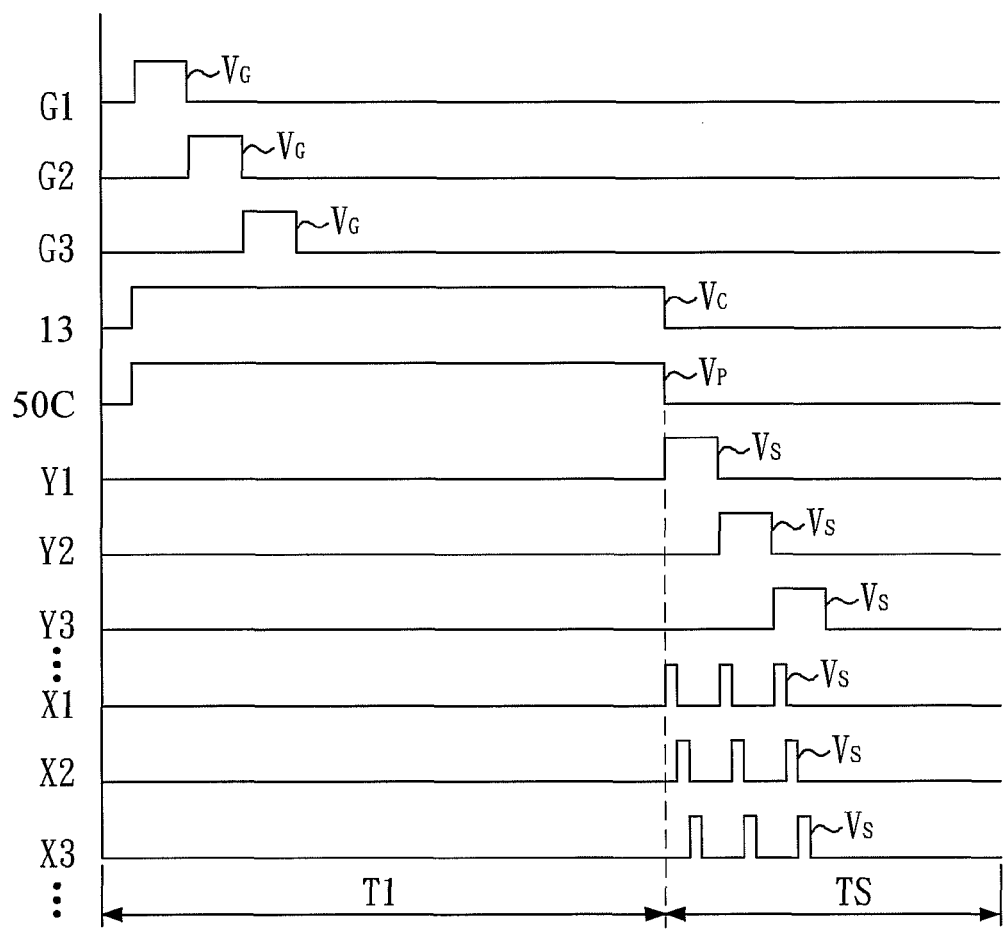
FIG. 7B is an example of FIG. 7A.

FIG. 7A and FIG. 7B illustrate a driving method and example of the touch panel shown in FIGS. 4-6. The period of one frame T is divided into a pixel period T1 and a sensing period Ts. During the pixel period T1, a gate voltage $V_G$ is supplied to the gate lines (G1, G2, G3 . . . ) in sequence, for respectively opening the thin-film transistors connected to the gate lines so as to write the pixel voltages to the connected pixel electrodes 13. In the meantime, a common voltage $V_C$ is supplied to the counter electrode 11. In the meantime, a shielding voltage $V_P$ is supplied to the shielding pattern 50b via the conductive wire 50c, such that the first conductive layer 50 function as an electrostatic protection layer during the pixel period T1. During the sensing period $T_S$, a sensing voltage $V_S$ is regularly supplied to the conductive wires (y1, y2, y3 . . . ) and conductive wires (x1, x2, x3 . . . ), such that the first conductive layer 50 function as a touch sensing layer of the touch sensors during the sensing period $T_S$. Notice that the example of FIG. 7B is provided for illustrative purposes, and the driving method may be different depending on the types of the display and the touch screens.

Figure 1:
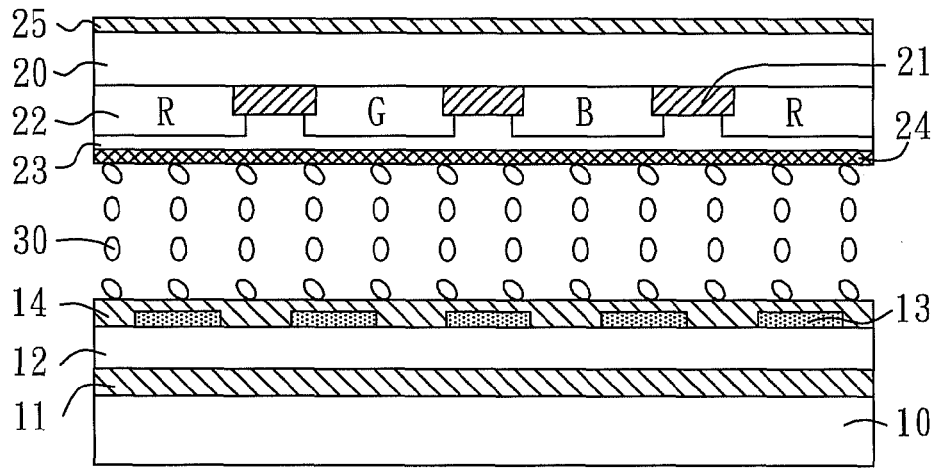
FIG. 1 is a cross-section of a Fringe Field Switching mode (FFS) liquid crystal display according to the prior art.
Figure 2:
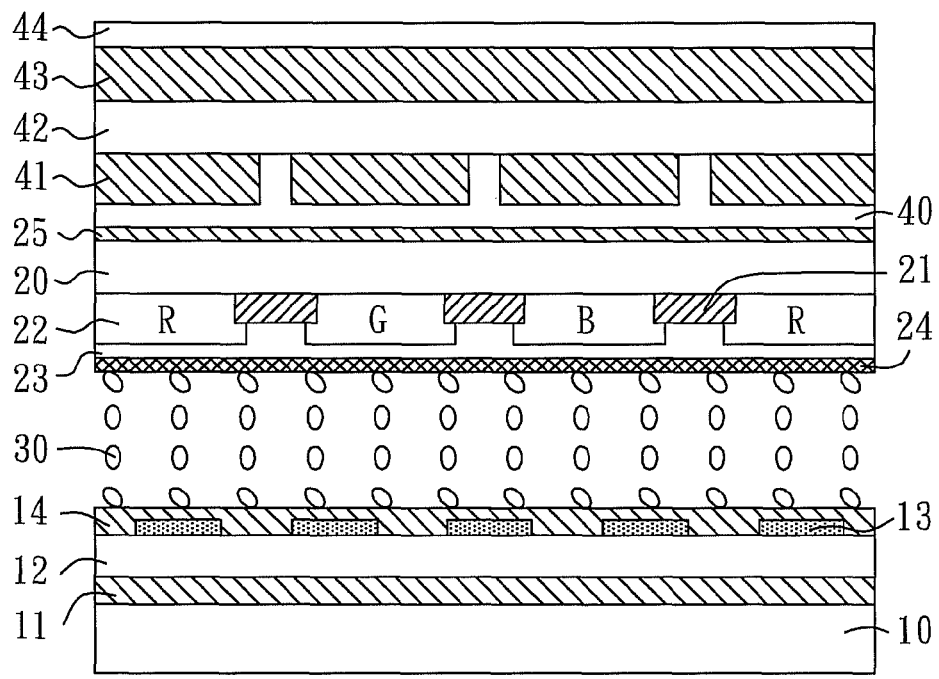
FIG. 2 shows a touch screen is formed on the FFS liquid crystal display of FIG. 1.

The above embodiments is applied to the FFS LCD shown in FIG. 1. The inventive concept is to divide the electrostatic protection layer 25 into two portions, in which one portion functions as a sensing layer and the other portion functions as an electrostatic protection layer; this can be achieved by the cooperation of the driving method. By doing so, the number of touch panel can be decreased by two, resulting in higher yield and lower cost than before. Similarly, the inventive concept can be employed to other displays with electrostatic protection layer, preferably multi-domain vertical alignment (MVA) displays, such as In-plane Switching mode (IPS) displays.

Although specific embodiments have been illustrated and described, it will be appreciated by those skilled in the art that various modifications may be made without departing from the scope of the present invention, which is intended to be limited solely by the appended claims.

What is claimed is:

1. A touch panel, comprising:
a touch screen, for sensing a touch position; and
a display arranged below the touch screen;
wherein the touch screen comprises a patterned, transparent first conductive layer comprising a first sensing pattern and a shielding pattern, in which the touch screen employs the sensing pattern as a sensing layer for sensing the touch position, and the display employs the shielding pattern as an electrostatic protection layer to protect the display from external electric discharge; and
wherein the display comprises:
an upper substrate;
a lower substrate comprising a counter electrode and a plurality of pixel electrodes; and
a liquid crystal layer arranged between the upper substrate and the lower substrate, and the first conductive layer is arranged on the outer surface of the upper substrate opposite to the lower substrate; and
wherein the display comprises a frame period comprising a pixel period for driving the liquid crystal layer and a sensing period for sensing the touch position, a shielding voltage supplied to the shielding pattern and a common voltage supplied to the counter electrode during the pixel period, and a sensing voltage supplied to the first sensing pattern during the sensing period.

2. The touch panel as recited in claim 1, further comprising:
a transparent over coating layer arranged on the first conductive layer; and
a patterned, transparent second conductive layer arranged on the over coating layer;
wherein the first conductive layer, the over coating layer, and the second conductive layer construct a plurality of touch sensors of the touch screen.

3. The touch panel as recited in claim 2, wherein the second conductive layer comprises a second sensing pattern and a dummy pattern.

4. The touch panel as recited in claim 3, wherein the second sensing pattern comprises a plurality of sensing pattern wires arranged parallel and electrically disconnected to one another, and the dummy pattern comprises a plurality of sub-dummy patterns arranged between the sensing pattern wires and electrically disconnected to any power source.

5. The touch panel as recited in claim 1, wherein the first sensing pattern comprises a plurality of sensing pattern wires arranged parallel and electrically disconnected to one another, and the shielding pattern comprises a plurality of shielding pattern wires arranged between the sensing pattern wires and electrically connected to one another.

6. The touch panel as recited in claim 5, wherein the shielding pattern further function as a dummy pattern of the first sensing pattern.

7. The touch panel as recited in claim 1, wherein the display is a Fringe Field Switching Mode (FFS) liquid crystal display.

8. The touch panel as recited in claim 1, wherein the display is an In-plane Switching mode (IPS) liquid crystal display.

* * * * *